United States Patent [19]

Hazenbroek

[11] 4,406,037
[45] Sep. 27, 1983

[54] DEVICE FOR CUTTING SLAUGHTERED POULTRY IN SEPARATE PIECES

[75] Inventor: Jacobus E. Hazenbroek, Numansdorp, Netherlands

[73] Assignee: Systemate B.V., Numandorp, Netherlands

[21] Appl. No.: 227,515

[22] Filed: Jan. 22, 1981

[30] Foreign Application Priority Data

Jan. 23, 1980 [NL] Netherlands ............... 8000424

[51] Int. Cl.³ .................................. A22C 21/00
[52] U.S. Cl. .................................. 17/11; 17/52
[58] Field of Search .................................. 17/11, 52

[56] References Cited

U.S. PATENT DOCUMENTS

| | | | |
|---|---|---|---|
| 3,132,373 | 5/1964 | Altenpohl | 17/44.1 |
| 3,946,461 | 3/1976 | Martin | 17/11 |
| 3,950,820 | 4/1976 | Duncan et al. | 17/11 |
| 4,251,901 | 2/1981 | Thomas et al. | 17/11 F |
| 4,306,335 | 12/1981 | Hawk et al. | 17/11 F |

FOREIGN PATENT DOCUMENTS 180975 of 1966 U.S.S.R. .

Primary Examiner—Willie G. Abercrombie
Attorney, Agent, or Firm—Beveridge, DeGrandi and Kline

[57] ABSTRACT

A device for cutting slaughtered poultry in separate pieces. A bird is held by at least one radial processing device which is movable on a frame by a driving device which is provided with a processing arm, at the side facing the frame being provided with an adjustment mechanism which can reorient the processing device during the movement of the arm in a number of various positions of rotation with respect to the arm and a blocking mechanism which can fix the processing device in said positions of rotation, with a deblocking mechanism for unlocking the processing device, and said processing arm at the side facing away from the frame being provided with a stretching mechanism for holding the bird. A number of driven knives mounted on the frame comprise of a first knife for cutting the breast, a second knife for cutting the first wing, a third knife for cutting the bird lengthwise in two halves, a fourth knife for cutting the other wing, a fifth knife for cutting the entire leg and a sixth knife for cutting the lower legs from the rumps.

14 Claims, 13 Drawing Figures

DEVICE FOR CUTTING SLAUGHTERED POULTRY IN SEPARATE PIECES

The present invention relates to a device for cutting slaughtered poultry in separate pieces.

In the method followed up till now for cutting slaughtered poultry in separate pieces this is done manually by special experts, who use knives whether or not driven by motors. When normal knives are used, it is hard and time-absorbing to cut slaughtered poultry in separate pieces, whereas using driven knives is particularly dangerous, especially when a high production is needed. In both cases only a relatively low production per time unit can be realised for that reason. An other objection against said known method is, that the poultry is cut in pieces with strongly different weight.

The object of the present invention is to remove the objections of said known method and device.

This object is reached in that according to the invention the device is characterized by a frame, by at least one radial processing device movable on the frame by a driving device, which is provided with a processing arm, at the side facing the frame being provided with an adjustment mechanism, which can adjust the processing device during the movement of the arm in a number of various positions of rotation with respect to the arm and a blocking mechanism which can fix the processing device in said positions of rotation, with a deblocking mechanism for unlocking the processing device, and said processing arm at the side facing away from the frame being provided with a stretching mechanism for the bird and by a number of driven knives mounted on the frame consisting of a first knife for cutting the breast, a second knife for cutting the first wing, a third knife for cutting the bird lengthwise in two halves, a fourth knife for cutting the other wing, a fifth knife for cutting the entire legs and a sixth knife for cutting the lower legs from the rumps.

By application of these features the poultry can be cut into nine pieces in a quick and safe manner with the device according to the invention, said nine pieces each having substantially the same weight. With the device according to the invention a production of about 1500 birds per hour can be reached with one person for placing the birds on the stretching mechanism.

The invention, summarized broadly, comprises a frame, a plurality of cutting stations which are spaced apart, a holding means for holding a bird, a drive means for moving the holding means in a machine direction through the cutting stations, and reorientation means for rotating the holding means between successive cutting stations to reorient the bird relative to the machine direction. Each of the cutting stations has a driven knife positioned in the path of a bird on the holding means. The reorientation means is operable while the holding means is located between successive cutting stations to unblock the holding means to permit rotation thereof, rotate the holding means to a different orientation, and block the holding means to retain it at the different orientation relative to the machine direction.

In a preferred embodiment of the device according to the invention the blocking mechanism is provided with a number of deblocking cams circularly fixedly mounted on the frame, a blocking pin which is mounted on the processing arm and which is retractable by means of the deblocking cams and can grip into a corresponding number of holes in a blocking disc mounted on the processing arm and that the adjustment mechanism is provided with a number of adjusting pins mounted on a hub on the processing arm and which can engage with a number of adjusting cams during the rotation of the processing arm, by which the processing device can be brought in said various positions of rotation.

By application of these features a very reliable device is obtained which has a high capacity and nevertheless is very safe in operation.

In a specially appropriate embodiment of the device according to the invention the stretching mechanism is provided with a support means for the bird, means for hanging the bird at its legs, means for holding the wings of the bird and means for holding the body of the bird on the support means.

According to the invention the stretching means comprises a rectangular frame mounted on the hub of the processing arm, a back support for the body of the bird, mounted at the front side of the frame, a two-armed lever with U-shaped suspension hooks for the knee joints, said lever being pivotably mounted on the upper side of the frame and opposite the suspension hooks at the other side of the pivot shaft connected to the frame by a tension spring, pivotable wing clamps, two pairs of pivotable support arms for the body of the bird, and a cam plate slidably mounted in the frame and provided with cam recesses for operating the support arms and with cams for operating the pivotable wing clamps.

The bird can easily and quickly be stretched with the stretching mechanism according to the invention, whereas the bird is fixedly stretched and is cut at the desired locations. After cutting all portions of the bird, apart from the breast, remain on the stretching mechanism, which can be loosened with a cam mounted on the frame of the device and the portions of the bird fall from the mechanism or can easily be removed therefrom respectively.

The invention will further be elucidated on the basis of the drawings.

Figure 10:

The FIGS. 6–9 are front views of the adjusting cams of the device according to the invention and FIG. 10 is a plan view of a deblocking cam.

Figures 11, 12:
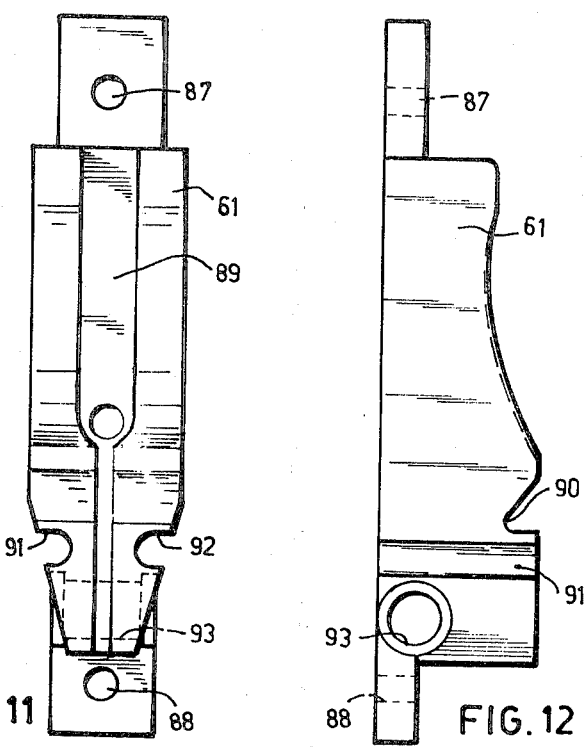
Figure 13:
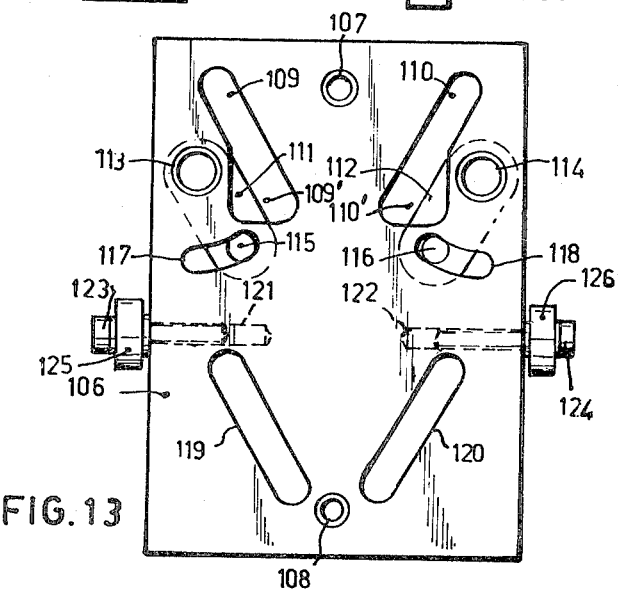

The FIGS. 11 and 12 are a front view and side view respectively of the back support of the stretching mechanism and FIG. 13 is a front view of the cam plate of the stretching mechanism.

The device according to the invention is mounted in a frame 1, substantially comprising a central column 2 and a horizontal frame plate 3, supported on legs 4. Centrally in the column 2 a driving shaft 5 is supported by means of ball bearings 6, which shaft 5 is driven by a motor (not shown) and drives the various knives 144–149 by means of a V-pulley 7, which knives are drawn in FIG. 3. These knives are circular-saw-shaped and can otherwise be provided with an own driving motor, for instance an electromotor or a hydraulic motor.

In the column 2 between the central driving shaft 5 and the column 2 a hub 8 is mounted by means of conical roller bearings 9, said hub 8 driving an upper plate 10 which is supported on the hub 8 by a lower ring 11 and an upper ring 12 and a number of support rods 13. The hub 8 is driven by a motor with reduction mechanism 14, driving the hub 8 via chain wheels 15 and 16 and a chain (not shown).

On the upper plate 10 a number of processing devices 18 are supported by means of supports 17 and 17', each of said processing devices essentially comprising a processing arm 19, an adjustment mechanism 20 and a stretching mechanism 21 which holds a bird and carries it through the cutting stations where the knives 144–149 are located. In a device according to the invention realised in practice eight processing units 18 are applied, but this number can of course be higher or lower. The processing arm 19 is rotatably mounted in the supports 17 by means of ball bearings 22 and 23. Furthermore a slidable blocking pin 24 is supported in the supports 17 and 17', which is moreover guided on the processing arm 19 by means of a guide arm 25 secured on the blocking pin 24, and a guide ring 26. Moreover a ring 27 is mounted on the blocking pin 24, whereas between the support 17 and the ring 27 a pressure spring 28 is mounted on the pin 24. which tries to press the pin 24 in FIG. 1 to the right.

The guide arm is at its free end provided with a rotatable roll 29, which can cooperate with three deblocking cams 30, 31 and 32, which are all uniform, and one deblocking cam 33 which is longer than the first three cams. The meaning thereof will be elucidated hereafter. The deblocking cams 30–33 are mounted on the lower plate 3 of the frame 1.

On the processing arm 19 an adjusting and blocking disc 34 is mounted (FIG. 4), in which four blocking holes 35, 36, 37 and 38 are applied, according to the number of deblocking cams 30–33. The blocking pin 24 can engage in the four blocking holes 35–38 in the disc 34, the first hole 35 of which corresponds to the vertical starting position A of the processing device 18, drawn in the FIGS. 1, 2, 3 and 4, and the other holes 36, 37 and 38 subsequently correspond to an angle of rotation of the processing device 18 over 56.5°, 90° and 123.5° from the vertical starting position A, in clockwise direction (vide arrow B in FIG. 4), seen in radial direction from the inside.

Figure 4:
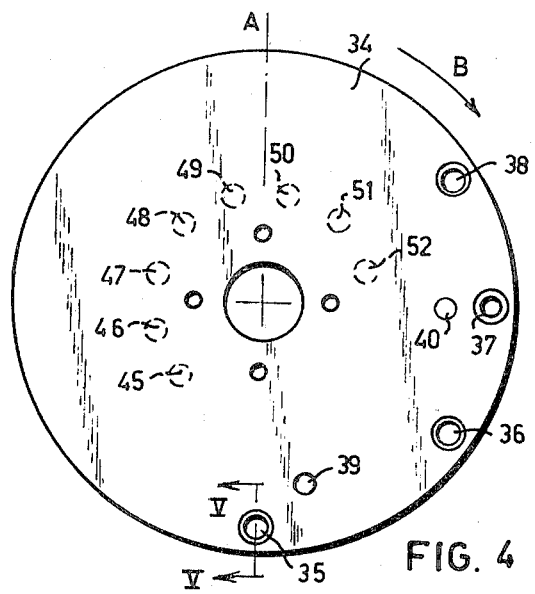
FIG. 4 is a schematic front view of the blocking disc with adjusting pins.

At the radial outer side of the disc 34 two axial adjusting pins 39 and 40 are mounted, in which, starting from the vertical starting position A in FIG. 4, the adjusting pin 39 is displaced in clockwise direction over an angle of 165° and the adjusting pin 40 over an angle of 90° in the same direction. During the rotation of the processing arm, these adjusting pins cooperate with fixed adjusting cams 41, 42 and 43 which are secured to the lower plate 3 as will be further elucidated hereunder (vide the FIGS. 3 and 6–8).

At the radial inner side of the disc 34 a crown of adjusting pins 45–52 is mounted, in which, starting from the vertical starting position A in FIG. 4, the pin 45 is displaced in clockwise direction over an angle of 225° and the pins 45, 46, 47 etc. each have a mutual angular distance of about 30°. During the rotation of the processing arm these adjusting pins 45–52 cooperate with an adjusting cam 44, as will be further elucidated on the basis of the FIGS. 3 and 9.

The device according to the invention preferably moves the birds in a circular machine direction. The device can, seen in plan view, be divided into four quadrants I, II, III and IV of each 90° (vide FIG. 3). In the first quadrant I the bird is preferably placed and stretched on the stretching mechanism 21, which comprises a means for holding the bird. In the second quadrant II, in the third quadrant III, and in a part of the fourth quadrant IV the slaughtered bird is cut in nine pieces of about the same weight, whereas in the remaining part of the fourth quadrant the stretching mechanism 21 is opened, and the loose portions of the bird are for instance received on a conveyor belt, placed beneath the fourth quadrant.

Hereinafter there is started from one rotatable processing arm 19, the starting position of which at 0° rotation is at the dividing line between quadrant I and quadrant II (vide FIGS. 2, 4 and 6–9). The machine direction of movement of the processing arm 19 is indicated in the FIGS. 6–9 with arrow C.

The first deblocking cam 30 is positioned at an angle of rotation of the processing arm 19 of about 32°, before which cam the stretching mechanism 21 is still vertical (position A in FIG. 4). The deblocking cam 30 presses the arm and therewith the locking pin 24 back from the hole 35 in the disc 24. Thereafter the adjusting pin 39 runs into the adjustment slot 53 of the first adjusting cam 41, which is also positioned at an angle of rotation of about 32°, the adjusting disc 34 and therewith the processing device 18 being rotated, clockwise over an angle of 56.5° in the direction B, seen from outside in radial direction after which the first deblocking cam 30 releases the blocking pin 24, and the latter grips into the second hole 36 in the disc 34.

The second deblocking cam 31 is positioned at an angle of rotation of about 87° in which the blocking pin 24 is retracted in the above-described manner.

The second adjusting cam 42 is also positioned at an angle of rotation of about 87°. Therewith the second adjusting pins 40 runs into the adjusting slot 54 of the second adjusting cam 42 and the processing device 18 is rotated over an angle of 33.5° in the direction B, after which the cam 31 releases the pin 24 and the latter grips into the third hole 37, the processing device 18 and the stretching mechanism 21 respectively being rotated rotally about an angle of 90° in the direction B from the vertical starting position A.

The third deblocking cam 32 is positioned at an angle of rotation of about 127°, the blocking pin 24 being retracted and the third adjusting cam 43 being positioned at an angle of rotation of also about 127°.

The second adjusting pin 40 runs into the adjusting slot 55 of the third adjusting cam 43 and the processing device 18 is once again rotated over an angle of 33.5° in the direction of the arrow B, after which the cam 32 releases the pin 24 and the latter grips into the fourth hole 38 in the disc 34.

The fourth deblocking cam 33 is positioned at an angle of rotation of about 172° of the processing arm 19, the blocking pin 24 being retracted. The fourth adjusting cam 44 is also positioned at an angle of rotation of about 172°, after which the last two adjusting pins 52 and 51 of the cycle 45–52 move in a horizontal plane to the horizontal plane 56 of the fourth adjusting cam 44, consisting of a gear rack with seven teeth holes 57, the crown of adjusting pins rolling-off as a pinion on the gear rack and the cam 58 urging the first adjusting pin 45 of the crown in upward direction. The processing device 18 is thereby further rotated over an angle of 236.5° up to the starting position A, after which the blocking pin 24 is released by the fourth deblocking cam 33 and the pin 24 grips again into the first blocking hole 35.

In FIG. 10 the configuration of the deblocking cam is drawn, in which the cams 30, 31 and 32 are uniform, have the same size and are constructed in straight manner. The cam 33 can be curved according to the circle of rotation of the roller 29 on the blocking pin 24, is longer than the cams 30, 31 and 32 and is provided with a rising face 59 and a falling face 60 just like the deblocking cams 30, 31 and 32.

Figure 1:
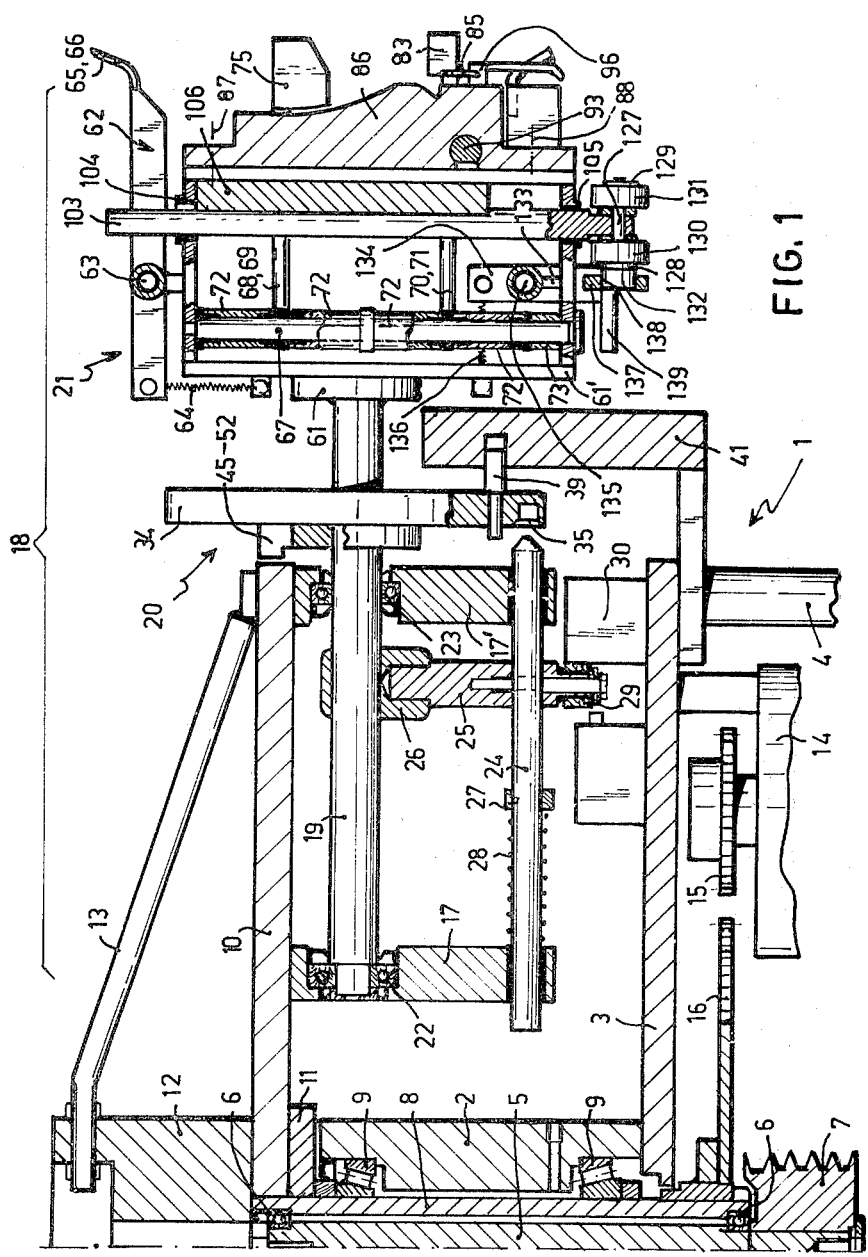
FIG. 1 is a side view of a processing arm with driving device.

The stretching mechanism 21 for holding a bird is mounted on a hub 61 at the end of the processing arm 19, FIG. 1. The mechanisms described in the preceding paragraphs comprise a reorientation means which operates when a bird is between successive cutting stations where blades 144-149 are located. The reorientation means unblocks the mechanism 21 to permit rotation thereof, it rotates the mechanism 21 to place it at a different orientation relative to the machine direction, and it then blocks the mechanism 21 to retain it at the different orientation. The stretching mechanism 21 is provided with a rectangular frame 61', on which at the upper side the lever 62 is mounted, which is pivotable on a shaft 63 and which is connected to the frame 61' by means of a tension spring 64 at the side facing the column 2. The lever 62 is double and at the other end of the two arms 62' and 62" provided with U-shaped suspension hooks 65 and 66, in which the bird is hanged at the knee joints.

In the vicinity of the point of engagement of the tension spring 64 the lever 62 can be provided with an adjustable stop, for instance a screw bolt in a transverse piece between the arms 62' and 62" of the U-shaped lever 62, said screw bolt being provided with a safety nut and engaging the upper side of the frame 61'. Therewith the position of the suspension hooks 65 and 66 can be adapted to the size of the bird and the pulling force exerted on the bird by the suspension hooks is restricted to a certain maximum.

In the frame 61' at the side in the vicinity of the processing arm 19 a shaft 67 is mounted on which two pairs of support arms 68, 69 and 70, 71 are supported. The support arms are kept at the correct distance from each other and in the frame 61' by means of distance sleeves 72, 73. The support arms 69, 68 are at their free ends provided with support plates 74 and 75 resp., FIG. 2, which press against the sides of the rumps of the bird. Furthermore in the vicinity of the support plates 74 and 75 retaining plates 76 and 77 are mounted, which are supported by means of sleeves 78 and 79 on the arms 68, 69 and are adjustably mounted on the arms 68 and 69 by means of bolt 80, 81. Said retaining plates 76 and 77 press against the upper side of the rumps of the bird such that the legs of the bird, when they are cut with one of the knives, cannot be drawn further upwardly by the lever 62.

Figure 2:
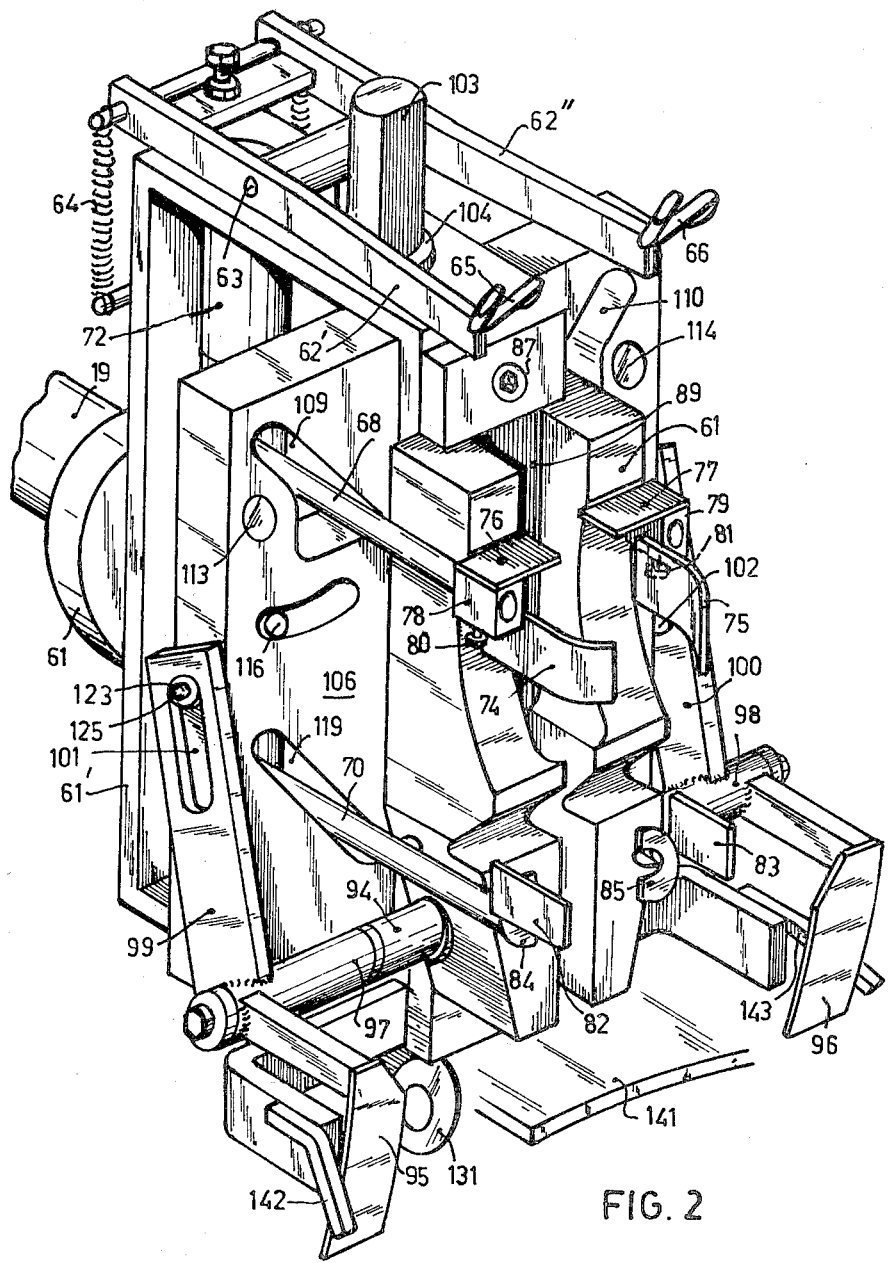
FIG. 2 is a perspective view of the stretching mechanism.

The support arms 70 and 71 are at their free ends provided with support plates 82 and 83, FIG. 2, engaging beneath the wings with the body of the bird. In the vicinity of the support plates 82 and 83 transverse grippers 84 and 85 are mounted on the support arm 70 and 71, said grippers engaging behind the backbone of the bird. The grippers 84, 85 are mounted on the support arms 70 and 71 in the configuration of a lying U.

At the outer side of the frame 61' a back support 86 is mounted by means of bolts through the holes 87 and 88, which bolts are screwed in the frame 61', vide the FIGS. 1 and 2. According to the FIGS. 11 and 12 the back support 86 is in the centre provided with a longitudinal slot 89, in which the knife for cutting the bird in two halves is moving. The back support 86 is furthermore provided with a recess 90, in which the knife for cutting the entire legs can move, with two lateral slots 91 and 92, in which the support arms 70, 71 can be received when stretching the bird and with a bore 93, in which a shaft 94 for pivotable wing clamps 95 and 96 issupported, FIG. 2, which engage over the wings of the bird. These wing clamps are mounted on sleeves 97 and 98, on which arms 99 and 100 are mounted which are provided with a longitudinal slot 101, 102, the function of which will be further elucidated hereafter.

Furthermore in the frame 61' at the outer side a slidable rod 103 is supported in slide bearings 104 and 105, FIGS. 1 and 2, on which rod a cam plate 106 is fixed with bolts, projecting through holes 107 and 108 in the cam plate 106 and are screwed in holes in the rod 103 which are provided with screw thread (FIG. 13). In the vicinity of the upper side the cam plate 106 is provided with a pair of cam slots 109 and 110 positioned in the shape of a V, through which the upper support arms 68 and 69 project. At the outer side of the cam slots 109 and 110 and at the radial inner side of the cam plate 106 a cam strip 111, 112 is outwardly pivotable against spring force, for instnce by means of a torsion spring which is mounted on a shaft which in turn is mounted in a hole 113, 114, for instance with a nut on screw thread on the shaft. In the vicinity of their other ends the cam strips 111 and 112 are provided with a pin 115, 116, which is movable in a slot 117, 118 in the cam plate 106 and pressed against the most inward end of the slot 117, 118 by the torsion spring. In this position of the cam strips 111 and 112 their inner edge is substantially positioned in the extension of the outer edge of the cam slots 109 and 110 and the cam strips cover the broader portion 109' and 110' of the cam slots 109 and 110.

In the vicinity of the lower side the cam plate 106 is provided with a pair of cam slots 119 and 120 positioned in the shape of a V, through which the lower support arms 70 and 71 project. Furthermore in the side faces of the cam plate 106 a hole 121 and 122 provided with screw thread is bored, in which a bolt 123 and 124 resp. is screwed, on the head of which a nylon roller 125 and 126 resp. is rotatably supported. Said nylon rollers 125 and 126 grip into the longitudinal slots 101 and 102 in the actuating arms 99 and 100 of the pivotable wing clamps 95 and 96.

On the lower end of the slidable rod 103 on a transverse shaft 127 a pair of nylon rollers 130 and 121 are supported by means of sleeves 128 and 129, whereas on the projecting inner end of the transverse shaft 127 a third nylon roller or cam 132 is mounted, FIG. 1. Furthermore on a support 133 on the frame 61' a U-shaped lever 134 is pivotably supported on a shaft 135, which lever at the upper side is connected to the frame 61' by a tension spring 136 and at the lower side carries an arm 137 at the one leg of the U, in which a slot 138 is mounted which in the operative position of the stretching mechanism 21 engages with the hole 138 over the nylon roller or cam 132 on the transverse shaft 127 of the slidable rod 103. The lever 135 carries an unlocking pin 139 at the other leg of the U.

Figure 3:
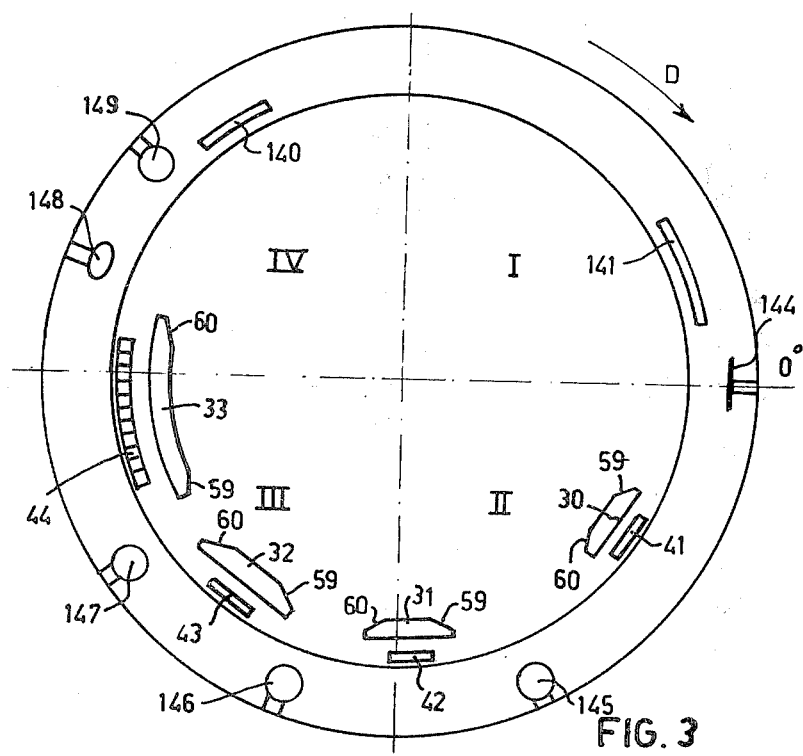
FIG. 3 is a schematic plan view of the device according to the invention.

According to FIG. 3 an unlocking cam 140 in the quadrant IV and a rising cam 141 in the quadrant I are mounted on the frame 1 of the device, which cooperate with the unlocking pin 139 and the nylon rollers 130 and 131 resp. at the lower side of the slidable rod 103, on which the cam plate 106 for the operation of the pairs of support arms 68, 69 and 70, 71 and the pivotable wing clamps 95 and 96 is mounted. At the outer side of the pivotable wing pins 95 and 96 fixed wing hooks 142 and 143 are mounted on the stretching mechanism 21, which facilitate and improve the positioning and stretching of a bird on the stretching mechanism 21 (FIG. 2).

Figure 5:
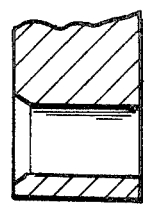
FIG. 5 is a cross section according to the line V—V in FIG. 4.
Figure 6:
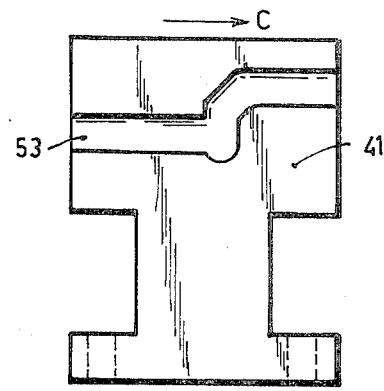
Figure 7:
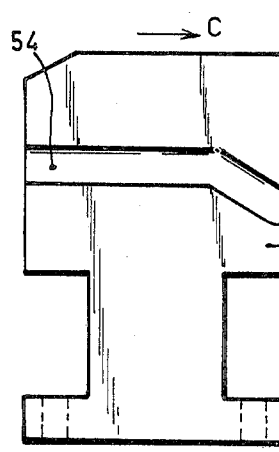
Figure 8:
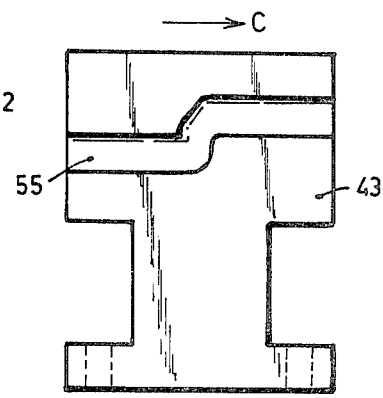
Figure 9:
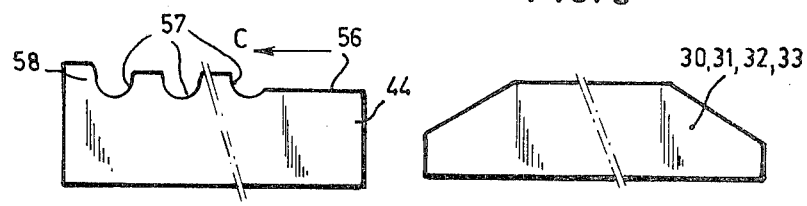

Further on the frame 1 of the device six driven circular-saw-knives 144, 145, 146, 147, 148 and 149 are mounted, FIG. 3. The knives are provided with drive motors of themselves, electrical or hydraulic, or they are centrally driven from the V-pully 7 (FIG. 5). The knives are mounted in supports (not drawn), which are universally adjustable, so that each knife is optimally adjustable. The knife 144 for cutting the breast is placed on the dividing line between the quadrant I and the quadrant II, where the angle of rotation of the processing device 18 is held at 0°. Starting from that the second knife 145 for cutting the one wing placed at an angle of rotation of 65° in clockwise direction, the third knife 146 for cutting bird lengthwise in two halves on an angle of rotation of 110°, the fourth knife 147 for cutting the other wing on an angle of rotation of 145°, the fifth knife 148 for cutting of the complete legs on an angle of rotation of 200° and the sixth knife for cutting of the underlegs of the rumps on an angle of rotation of 220°.

Now the working of the device according to the invention will be described. After that the processing arm 18 has passed the unlocking cam 140 in the quadrant IV, and the stretching mechanism 21 is open and is emptied, a slaughtered bird is put into the stretching mechanism 21, during the rotation of the processing arm between the unlocking cam 140 and the locking cam 141. The bird is hung in the suspension hooks 65 and 66 with the knee joints and is hooked with the wings under the fixed wing hooks 142 and 143. This can be done very quickly, so that with only two persons on the device, one for removing the parts of the bird, which fall out of the stretching mechanism 21 of themselves, and one for hanging a new bird, a production of approximately 1500 birds an hour can be reached.

When the processing arm 18 during the rotation in the arrow D in FIG. 3 reaches the rising cam 141, the nylon rolls 130 and 131 run on the rising cam and the rod 103 takes the cam plate with it upwardly, by which the upper support arms 68 and 69 are being turned inwardly by means of the cam slots 119 and 120 and the support arms 70 and 71 are being turned inwardly by means of the cam slots 119 and 120 and support the bird in the described way. Also the pivotable wing clamps 95 and 96 are closed by means of the rolls 126 and the arm 137 of the locking lever 134 is being pushed with the hole 138 onto the roll 132 by means of the tension spring 136, by means of which the stretching mechanism is locked.

The processing device 18 passes the first knife 144 with the stretching mechanism in vertical postion A (FIG. 4), by which the breast of the bird is being cut off. The first knife stands substantially vertically, but inclines backwardly at an angle of 5° and has a free running angle in the direction of rotation D of 8°.

When passing the first deblocking cam 30 and the first adjusting cam 41 the stretching mechanism 21 is rotated in the direction B (FIG. 4) over an angle of 56.5° in the above described way and is blocked again.

When passing the second knife 145, that is placed in a horizontal level and which is disposed at an angle of rotation of 65° of the processing device 18 in the direction of the arrow D, the one wing of the bird is being cut-off.

The processing arm then rotates alongside the second deblocking cam 31 and the second adjusting cam 42 and the stretching mechanism 21 are being rotated further over an angle of 33.5° in arrow direction B, by which the stretching mechanism 21 comes to lie horizontally.

In this horizontal position the bird is cut lengthwise in two halves by the third knife 146, which also lies at a horizontal level, and which is positioned at an angle of rotation of 110°.

Just in front of the third knife 146 a centering member for the breast bone of the bird can be positioned on the frame 1 of the device, which comprises two rolls, mounted on a vertically axle, which are provided with a cone-shaped portions at the sides that are facing each other, so that a V-shaped centering groove is formed for the breast bone of the bird.

Then the processing arm passes the third deblocking cam 32 and the third adjusting cam 43, by which the stretching mechanism 21 is rotated again over an angle of 33.5° in the arrow direction B, so that the stretching mechanism is in total rotated over an angle of 123.5° in the arrow direction B.

The fourth knife 147, which also lies at a horizontal level and is disposed on an angle of rotation of 145°, cuts off the other wing of the bird.

By means of the fourth deblocking cam 33 and the fourth adjusting cam 44 the stretching mechanism 21 is rotated further in the arrow direction B to the position A according to FIG. 4, over an angle of rotation of 236.5° in the way as described above, by which the stretching mechanism is again vertical.

The fifth knife 148 is inclined downwardly at an angle of rotation of ±45° with respect to the horizontal level and is positioned at an angle of rotation of 200° in the arrow direction D. The fifth knife cuts off the entire legs of the bird.

Between the fifth knife and the sixth knife 149 the stretching mechanism keeps standing in the vertical postion A and the sixth knife 149 lies in a horizontal level, it is positioned at an angle of rotation of 220° in the arrow direction D of the processing arm 19 and cuts off the under-legs from the rumps of the bird.

After the sixth knife 149 the stretching mechanism 21 passes the unlocking cam 140, by which the cam 140 pushes the unlocking pin 139 of the lever 134 (FIG. 1) upwardly, the arm 137 moves away from the roll 132 and the rod 103 moves downwardly together with the cam plate 106 because of their own weight, by which the support arms 68,69 and 70, 71, and also the pivotable wing pins 95, 96 are being opened by the cam slots 109, 110 and 119, 120 and the rolls 126 respectively and the parts of the bird that are no longer held fall out of the stretching mechanism 21, by which the under-legs are being pushed out of the suspension hooks 65 and 66 with a guide.

The broader parts 109' and 110' of the cam slots 109, 110 have the purpose of making possible a widthwise variable position of the support arms 68 and 69, so that the birds with variable weight and size can be stretched.

Six cutting devices are used with the above described device according to the invention, by which the bird can be cut in nine separate pieces. Depending of the desired number of pieces one or more cutting devices can be placed out of action by dismounting the knife or the entire cutting device.

Further the device according to the invention can also be embodied as an oval machine, which comprises two straight frame parts, that are connected to each other by two semi-circular parts of the frame, by which the processing devices 18 are being moved alongside the straight parts and the semi-circular parts of the frame, for instance with the aid of a driving chain. The frame of the device could also be embodied as a straight frame, in which the processing devices 18 can be led alongside the guides in the straight frame with the aid of for instance a driving chain.

What is claimed is:

1. An apparatus for cutting slaughtered poultry into separate pieces, comprising,
    a frame,
    a plurality of cutting stations which are spaced apart,
    a holding means for holding a bird, said holding means being supported on the frame and being movable in a machine direction to carry a bird successively through said cutting stations, said holding means being rotatable to change the orientation of a bird thereon with respect to the machine direction,
    drive means for moving the holding means in said machine direction to carry the holding means through said cutting stations,
    reorientation means operable while the holding means is located between successive cutting stations for unblocking the holding means to permit rotation thereof, rotating the holding means to a different orientation, and blocking the holding means to retain it at said different orientation relative to the machine direction,
    each of said cutting stations having a driven knife positioned in the path of a bird on said holding means.

2. An apparatus according to claim 1 wherein the reorientation means is operable to place a bird at an orientation where said knife at one cutting station cuts the breast, a knife at another cutting station cuts the bird lengthwise into two halves, a knife at another cutting station cuts a second wing, a knife at another cutting station cuts the legs, and a knife at another cutting station cuts the lower legs from the rumps.

3. An apparatus according to claim 1 wherein said reorientation means comprises the following:
    an adjusting and blocking disc which is connected to and rotatable with said holding means, said adjusting and blocking disc having a plurality of holes and a plurality of adjusting pins,
    a blocking pin which is movable in the machine direction with the holding means, said blocking pin being movable between an engaged position and a retracted position where it is respectively engaged and retracted from one of the holes in said disc,
    a plurality of deblocking cam means affixed to the frame for moving said locking pin to its retracted position,
    a plurality of adjusting cam means affixed to the frame for engaging said adjusting pins to rotate said holding means.

4. An apparatus according to claim 1 wherein the holding means comprises the following:
    a support member,
    means for engaging the legs of the bird to hang the bird in front of the support member,
    means for holding the wings of the bird, and
    means for holding the body of the bird at a fixed orientation in front of the support member.

5. An apparatus according to claim 1 wherein the holding means comprises the following:
    a base member,
    a back support for the body of the bird, said back support being mounted at the front of the base member,
    a pair of levers pivotally mounted on an upper portion of the base member and having forward ends provided with U-shaped suspension hooks for engaging the knee joints of the bird, said levers having rear ends connected to the base member by tension springs,
    a pair of pivoted support arm provided with means for engaging the body of the bird,
    a pair of pivoted wing clamps for holding the wings of a bird and
    a cam plate slidably mounted on the base member, said cam plate having recesses engaged with the support arms for moving the support arms in response to sliding movement of the cam plate, said cam plate having cams for moving the wing clamps in response to sliding movement of the cam plate.

6. An apparatus according to claim 5 wherein two said support arms are provided with retaining plates located to project inwardly to engage the rump of the bird, and two said support arms are provided with transverse plate-like grippers located to engage behind the backbone of the bird.

7. An apparatus according to claim 6 wherein said retaining plates are adjustably supported on the support arms for movement in planes which are perpendicular to the support arms.

8. An apparatus according to claim 5 having wing hooks affixed to the base member in the vicinity of the wing clamps.

9. An apparatus according to claim 8 wherein two said support arms are provided with retaining plates located to project inwardly to engage the rump of the bird, and two said support arms are provided with transverse plate-like grippers located to engage behind the backbone of the bird.

10. An apparatus according to claim 9 wherein said retaining plates are adjustably supported on the support arms for movement in planes which are perpendicular to the support arms.

11. An apparatus according to claim 5 having a shaft which is pivotally mounted on the frame and is connected to the support arms,
    a rod which is slidable on the base member and is connected to the cam plate, said rod having a cam follower at one end for engaging a rising cam on the frame,
    a locking lever pivotally mounted on the base member and having means for holding said rod and the cam plate at a given position when a bird is on the holding means,
    an unlocking cam affixed to the frame for disengaging said locking lever from said rod to permit movement of the rod and the cam plate from said given position.

12. An apparatus according to claim 11 wherein two said support arms are provided with retaining plates located to project inwardly to engage the rump of the bird, and two said support arms are provided with transverse plate-like grippers located to engage behind the backbone of the bird.

13. An apparatus according to claim 12 wherein said retaining plates are adjustably supported on the support arms for movement in planes which are perpendicular to the support arms.

14. An apparatus according to claim 12 having wing hooks affixed to the base member in the vicinity of the wing clamps.

* * * * *

UNITED STATES PATENT AND TRADEMARK OFFICE
CERTIFICATE OF CORRECTION

PATENT NO. : 4,406,037
DATED : September 27, 1983
INVENTOR(S) : JACOBUS E. HAZENBROEK It is certified that error appears in the above—identified patent and that said Letters Patent is hereby corrected as shown below:

On the title page:
Change the assignee designation to read as follows:

[73] Assignee: Tieleman B.V.

Doesburg, Netherlands

Signed and Sealed this

Twenty-ninth Day of November 1983

|SEAL|

Attest:

GERALD J. MOSSINGHOFF

Attesting Officer — Commissioner of Patents and Trademarks